US011674475B2

(12) United States Patent
Lauder et al.

(10) Patent No.: US 11,674,475 B2
(45) Date of Patent: Jun. 13, 2023

(54) STRUCTURAL SINGLE DEGREE OF FREEDOM ACOUSTIC LINER

(71) Applicant: The Boeing Company, Chicago, IL (US)

(72) Inventors: Arnold J. Lauder, Winnipeg (CA); Jessica Fichtner, Winnipeg (CA); Stefan Ozog, Winnipeg (CA)

(73) Assignee: The Boeing Company, Chicago, IL (US)

( * ) Notice: Subject to any disclaimer, the term of this patent is extended or adjusted under 35 U.S.C. 154(b) by 665 days.

(21) Appl. No.: 16/722,171

(22) Filed: Dec. 20, 2019

(65) Prior Publication Data

US 2021/0190007 A1 Jun. 24, 2021

(51) Int. Cl.
| | |
|---|---|
| *F02K 1/82* | (2006.01) |
| *G10K 11/16* | (2006.01) |
| *F02C 7/24* | (2006.01) |
| *B32B 3/12* | (2006.01) |
| *G10K 11/168* | (2006.01) |
| *G10K 11/172* | (2006.01) |

(52) U.S. Cl.
CPC ............... *F02K 1/827* (2013.01); *B32B 3/12* (2013.01); *F02C 7/24* (2013.01); *G10K 11/16* (2013.01); *G10K 11/168* (2013.01); *G10K 11/172* (2013.01); *F05D 2250/283* (2013.01); *F05D 2260/96* (2013.01); *F05D 2300/43* (2013.01); *F05D 2300/44* (2013.01)

(58) Field of Classification Search
CPC . F02K 1/827; B32B 3/12; F02C 7/045; F02C 7/24; G10K 11/16; G10K 11/168; G10K 11/172

USPC .......................................................... 181/292
See application file for complete search history.

(56) References Cited

U.S. PATENT DOCUMENTS

| | | | | |
|---|---|---|---|---|
| 4,816,097 | A * | 3/1989 | Williams ............... | B23K 26/18 428/116 |
| 5,543,198 | A * | 8/1996 | Wilson ................... | B32B 7/12 428/116 |
| 6,183,837 | B1 * | 2/2001 | Kim ....................... | E04B 1/86 428/118 |
| 6,203,656 | B1 * | 3/2001 | Syed ...................... | B29C 66/543 156/292 |
| 2002/0157764 | A1 * | 10/2002 | Andre .................... | G10K 11/172 156/252 |

(Continued)

FOREIGN PATENT DOCUMENTS

| | | | | |
|---|---|---|---|---|
| EP | 2596946 A1 * | 5/2013 | ............. | B32B 15/08 |
| EP | 3524423 A1 * | 8/2019 | ............. | B29C 65/48 |

(Continued)

*Primary Examiner* — Jeremy A Luks
(74) *Attorney, Agent, or Firm* — Quinn IP Law (57) ABSTRACT

The present disclosure provides a co-bonded acoustic liner, including a honeycomb core with cells therein, a thermoset-based plastic septa material co-bonded to a top face of the honeycomb core; a facesheet with perforations to enable airflow, co-bonded to the thermoset-based plastic septa material; and an optional backside skin positioned under the honeycomb core, co-bonded to the bottom face of the honeycomb core, wherein the liner supports a single degree of freedom acoustic structure. The disclosure further provides methods of preparing and using such co-bonded acoustic liners.

26 Claims, 7 Drawing Sheets

(56) References Cited

U.S. PATENT DOCUMENTS

| | | | | |
|---|---|---|---|---|
| 2012/0037449 A1* | 2/2012 | Ayle | .................... | G10K 11/172 |
| | | | | 29/896.2 |
| 2013/0171407 A1* | 7/2013 | Franzoi | ............... | G10K 11/172 |
| | | | | 428/116 |
| 2015/0027629 A1* | 1/2015 | Butler | ................. | G10K 11/168 |
| | | | | 156/306.6 |
| 2016/0264231 A1* | 9/2016 | Stache | ................ | G10K 11/168 |
| 2017/0175642 A1* | 6/2017 | Lumbab | ................... | F02C 7/24 |
| 2018/0022056 A1* | 1/2018 | Shen | ....................... | F16F 1/37 |
| | | | | 428/117 |
| 2018/0029719 A1* | 2/2018 | Follet | .................... | B64D 29/00 |
| 2018/0162542 A1* | 6/2018 | VanDeMark | .......... | B64D 33/02 |
| 2018/0257196 A1* | 9/2018 | Simpson | ................... | B24C 1/04 |
| 2021/0193100 A1* | 6/2021 | Froning | .................... | C09J 5/06 |

FOREIGN PATENT DOCUMENTS

| | | | | | |
|---|---|---|---|---|---|
| GB | 2300380 | A | * | 11/1996 | ............... B32B 3/12 |
| GB | 2588857 | A | * | 5/2021 | ........... B32B 37/146 |

\* cited by examiner

STRUCTURAL SINGLE DEGREE OF FREEDOM ACOUSTIC LINER

BACKGROUND

Field of the Disclosure

The present disclosure relates to acoustic liners for dampening noise, and more particularly, to methods of making such liners and incorporating them within aircraft housings and assemblies.

Description of Related Art

Composite structures and panels are used in a wide variety of applications. In particular, composite panel assemblies are employed within aircrafts, e.g., to dissipate/dampen engine noise (referred to as acoustic liners). Such liners can be applied, e.g., on the internal walls of the engine nacelle of aircrafts, in intake and bypass ducts.

Figure 1A:
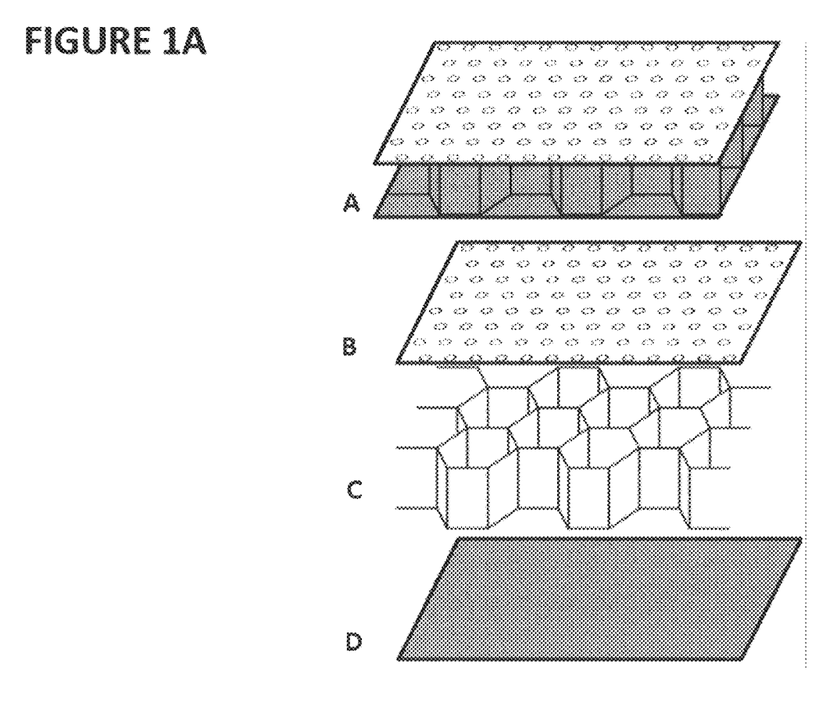
FIG. 1A schematically illustrates a conventional composite sandwich configuration.
Figure 1B:
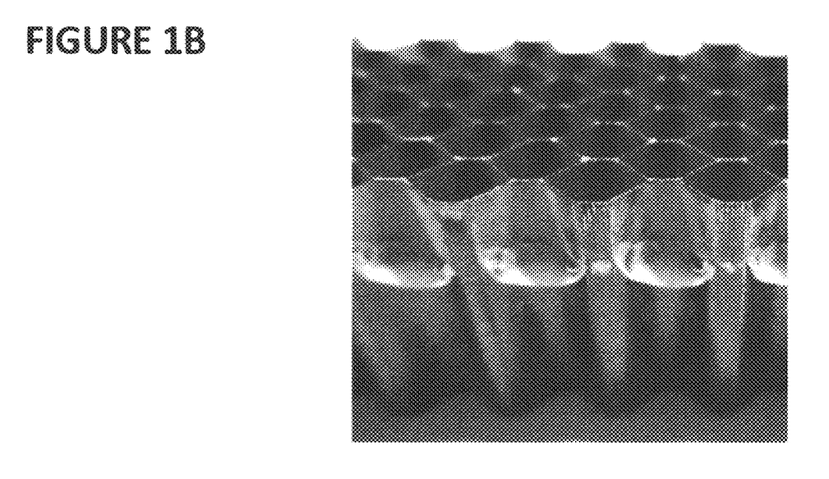
FIG. 1B is a photograph of a cross-section of a honeycomb core of a conventional composite sandwich configuration with an imbedded acoustic septa material.

Acoustic liners generally are in the form of a composite sandwich panel, including a perforated/porous top layer (face sheet), a core comprising a series of small cavities/cells (commonly called a honeycomb sheet/core), and a backing layer/skin. This general arrangement is illustrated schematically in FIG. 1A, wherein "A" is the composite sandwich panel, "B" is the perforated top layer, "C" is the honeycomb core, with individual cells clearly visible, and "D" is the backing layer. The honeycomb sheet/core can be made of varying materials, but generally features an embedded acoustic porous septum layer bonded to the inside walls of the individual honeycomb core cells within the sheet (as generally depicted in the photograph of FIG. 1B). The septum material in the cells of the honeycomb core act as Helmholtz resonators, attenuating engine noise within the aircraft.

The three layers of the composite sandwich panel are generally bonded together to provide a single degree of freedom (SDOF) liner. Sound dampening effects are tuned, e.g., by varying the porosity and/or thickness of the top layer and the cell/cavity dimensions within the honeycomb core.

The proper functioning of these acoustic liners requires precise bonding of the septum material to the individual honeycomb cells, as well as precise bonding between adjacent layers and avoidance of delamination of layers of the composite sandwich panel during assembly and/or during use. Certain materials commonly employed for the various components of the composite structures do not readily bond to one another. Further, the production of acoustic liners, due at least in part to the application of the acoustic septum layer within each individual honeycomb cell, is costly.

It would be advantageous to provide alternative composite sandwich panels suitable for use as single degree of freedom acoustic liners, e.g., to address such issues.

SUMMARY

The disclosure provides new materials to replace, e.g., acoustic mesh materials or embedded septa materials currently used as acoustic liners in acoustically treated honeycomb cores of composite materials within nacelle assemblies. Such alternative materials can be included within composite sandwich panels to provide panels suitable for use as single degree of freedom acoustic liners in aircraft assemblies. In particular, the disclosure identifies an alternative thermoset-based septa material that can be applied to the outside edge of honeycomb core cells/cavities within such panels.

The present disclosure includes, without limitation the following embodiments.

Embodiment 1: a co-bonded acoustic liner, comprising: a honeycomb core comprising a honeycomb structured pattern in the form of cells with cell walls, a top face perpendicular to the cell walls and on a top, open surface of the cells, and a bottom face perpendicular to the cell walls and on a bottom, open surface of the cells; a thermoset-based plastic septa material co-bonded to the top face of the honeycomb core; a facesheet comprising perforations to enable airflow, co-bonded to the thermoset-based plastic septa material; and an optional backside skin positioned under the honeycomb core, co-bonded to the bottom face of the honeycomb core, wherein the co-bonded acoustic liner supports a single degree of freedom acoustic structure.

Embodiment 2: The co-bonded acoustic liner of the preceding embodiment, wherein the thermoset-based plastic septa material is in the form of a film.

Embodiment 3: The co-bonded acoustic liner of the preceding embodiment, wherein the film is from about 0.001 inches to about 0.035 inches in thickness, e.g., from about 0.001 inches to about 0.015 inches in thickness or from about 0.015 inches to about 0.035 inches.

Embodiment 4: The co-bonded acoustic liner of any preceding embodiment, wherein the thermoset-based plastic septa material does not extend to any significant extent into the cells.

Embodiment 5: The co-bonded acoustic liner of any preceding embodiment, wherein the thermoset-based plastic septa material comprises an epoxy.

Embodiment 6: The co-bonded acoustic liner of any preceding embodiment, wherein the thermoset-based plastic septa material is perforated.

Embodiment 7: The co-bonded acoustic liner of any preceding embodiment, wherein the thermoset-based plastic septa material has a percentage open area of from about 2 to about 15.

Embodiment 8: The co-bonded acoustic liner of any preceding embodiment, wherein the thermoset-based plastic septa material comprises perforations of from about 0.001 inches to about 0.01 inches in diameter.

Embodiment 9: The co-bonded acoustic liner of any preceding embodiment, wherein thermoset-based plastic septa material is perforated, and wherein the perforations are smaller in diameter than the perforations of the facesheet.

Embodiment 10: The co-bonded acoustic liner of any preceding embodiment, wherein the facesheet has a percentage open area of from about 5 to about 30 or about 10 to about 30.

Embodiment 11: The co-bonded acoustic liner of any preceding embodiment, wherein the facesheet comprises perforations of from about 0.02 inches to about 0.3 inches in diameter or slots with length and width, wherein the width is from about 0.02 inches to about 0.1 inches and the length is from a value equivalent to the width to 1 inch.

Embodiment 12: The co-bonded acoustic liner of any preceding embodiment, wherein the facesheet comprises a thermoplastic material or a thermoset material.

Embodiment 13: The co-bonded acoustic liner of any preceding embodiment, further comprising an adhesive layer between the facesheet and the thermoset-based plastic septa material.

Embodiment 14: The co-bonded acoustic liner of the preceding embodiment, wherein the adhesive layer comprises a reticulated film adhesive.

Embodiment 15: The co-bonded acoustic liner of any preceding embodiment, further comprising an adhesive layer between the optional backside skin and the bottom face of the honeycomb core.

Embodiment 16: The co-bonded acoustic liner of the preceding embodiment, wherein the adhesive layer comprises a reticulated film adhesive.

Embodiment 17: A nacelle for an airplane engine, the nacelle comprising the co-bonded acoustic liner of any preceding embodiment.

Embodiment 18: A method of dampening sound, comprising employing the co-bonded acoustic liner of any preceding embodiment.

Embodiment 19: A method of producing a co-bonded acoustic liner, comprising: providing a honeycomb core comprising a honeycomb structured pattern in the form of cells with cell walls, a top face perpendicular to the cell walls and on a top, open surface of the cells, and a bottom face perpendicular to the cell walls and on a bottom, open surface of the cells; applying and curing a thermoset-based plastic septa material onto the top face of the honeycomb core; and applying a facesheet comprising perforations to the thermoset-based plastic septa material to provide the co-bonded acoustic liner, wherein the co-bonded acoustic liner supports a single degree of freedom acoustic structure.

Embodiment 20: The method of any preceding embodiment, wherein the thermoset-based plastic septa material is applied in the form of a film.

Embodiment 21: The method of any preceding embodiment, wherein the thermoset-based plastic septa material comprises an epoxy.

Embodiment 22: The method of any preceding embodiment, further comprising perforating the thermoset-based plastic septa material.

Embodiment 23: The method of the preceding embodiment, wherein the perforating comprises laser perforating.

Embodiment 24: The method of Embodiment 22 or 23, wherein the laser perforating comprises making perforations to give a percentage open area of from about 2 to about 15.

Embodiment 25: The method of any of Embodiments 22-24, wherein the laser perforating comprises making perforations of from about 0.0005 inches to about 0.01 inches, or about 0.001 inches to about 0.01 inches in diameter.

Embodiment 26: The method of the preceding embodiment, wherein the method further comprises applying a backside skin to the bottom face of the honeycomb core.

Embodiment 27: The method of the preceding embodiment, further comprising applying an adhesive between the backside skin and the bottom face of the honeycomb core.

Embodiment 28: The method of any preceding embodiment, further comprising incorporating the co-bonded acoustic liner within a nacelle, such as an airplane nacelle.

These and other features, aspects, and advantages of the present disclosure will be apparent from a reading of the following detailed description together with the accompanying drawings, which are briefly described below. The present disclosure includes any combination of two, three, four, or more embodiments, features, or elements set forth in this disclosure, regardless of whether such embodiments, features, or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example embodiments are merely examples and should not be construed to narrow the scope or spirit of the disclosure in any way. It will be appreciated that the scope of the disclosure encompasses many potential embodiments, some of which will be further described below, in addition to those herein summarized. Further, other aspects and advantages of such embodiments disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

A modified honeycomb core is provided herein for inclusion within a composite sandwich assembly, which comprises an alternative structure and composition to conventional honeycomb cores (e.g., with such conventional cores having a thermoplastic acoustic septum layer bonded to the inside walls of individual honeycomb cells). In particular, the modified honeycomb core provided herein incorporates a thermoset septum material. A thermoset material, also commonly referred to as a "thermosetting material," is a polymer that can be formed, molded, etc., and subsequently cured (i.e., hardened) in a non-reversible manner, such that they cannot successfully be reformed or remolded. As such, the cured thermoset material typically comprises cross-linked polymers. The method of curing can vary and may comprise treatment by heat, radiation, pressure, catalysis, co-reaction with certain other components (hardeners/curatives) or any combination thereof.

Exemplary thermosets that can be employed to provide the septum material of the presently disclosed modified honeycomb core include, but are not limited to, epoxy resins (which are cured to provide an epoxy septum). Epoxy resins generally comprise oligomers/pre-polymers and polymers with epoxide groups (often called "polyepoxides"), which are reacted with themselves or with various co-reactants (hardeners/curatives), including, but not limited to, amines, acids, acid anhydrides, phenols, alcohols, and thiols. Exemplary epoxy resins include, but are not limited to, glycidyl-based epoxy resins (e.g., bisphenol A diglycidyl ether, BADGE/DGEBA or bisphenol F diglycidyl ether, BFDGE), novolac epoxy resins, aliphatic epoxy resins (e.g., cycloaliphatic epoxides and epoxidized vegetable oils or glycidyl ethers and esters), halogenated epoxy resins, and glycidylamine epoxy resins.

Figure 2:
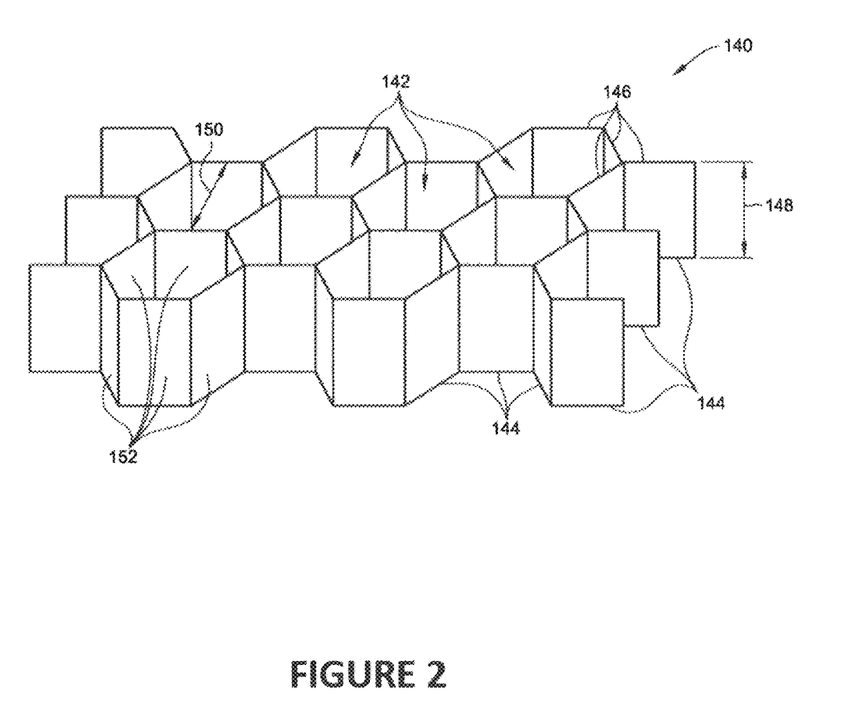
FIG. 2 is a perspective view of portion of a honeycomb core that can be used according to an embodiment of the present disclosure.

According to the present disclosure, a thermoset as described above is not, to any significant extent, disposed within the individual cells of the honeycomb core. Rather, the thermoset is present as a film on the outside edge of honeycomb core cells (i.e., on a bottom face of the honeycomb core, perpendicular to the walls of the cells/coplanar with the honeycomb core). FIG. 2 is a perspective view of a portion of one embodiment of honeycomb core 140 with the plurality of cells 142 arranged in a honeycomb pattern. The plurality of honeycomb core cells 142 is defined by a corresponding plurality of core cell walls 152. Each cell wall 152 extends from a first edge 144 of the honeycomb core to a second edge 146 of the honeycomb core. Each cell 142 has a characteristic cross-sectional diameter 150 that can vary. For example, in the embodiment illustrated in FIG. 2, characteristic cross-sectional diameter 150 is defined between opposing cell walls 152 of the hexagon. In some embodiments, each cell 142 has a cross-sectional characteristic diameter 150 in a range of from about 0.1 to about 1.0 inch, such as about 0.2 to about 0.5 inches, e.g., about 0.375 inches. This characteristic cross-sectional diameter 150 is, in various embodiments, any suitable characteristic diameter that enables the honeycomb to function as described herein within a composite sandwich assembly/acoustic liner.

Figure 3:
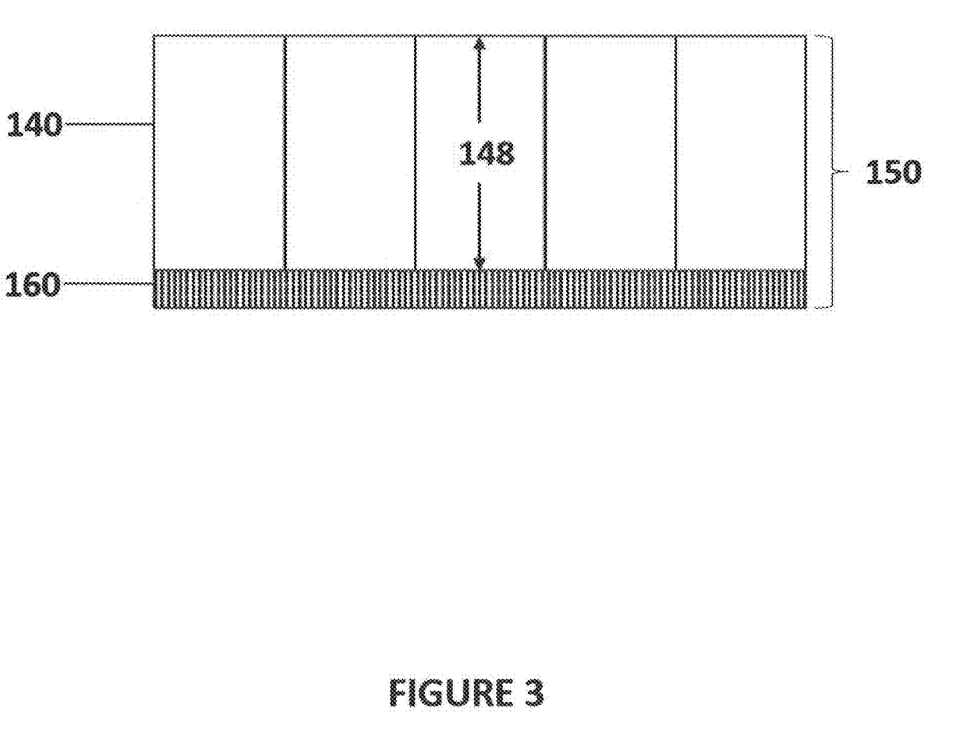
FIG. 3 is a schematic side view of an exemplary modified honeycomb core according to an embodiment of the present disclosure.

A thickness 148 (as shown in FIG. 3) of first core 140 is defined between first edge 144 and second edge 146. In some embodiments, the core thickness 148 is chosen to facilitate damping of at least a portion of a particular acoustic frequency profile expected to be encountered by the honeycomb core. In certain embodiments, thickness 148 is in a range of from about 0.5 to about 4.0 inches, or from about 1 to about 3 inches, from about 1 to about 2 inches, or from about 2 to about 3 inches. In alternative embodiments, thickness 148 is any suitable thickness that enables the corresponding composite sandwich assembly/acoustic liner to function as described herein. Although in the illustrated embodiment, the cells of the honeycomb core are shown to be hexagonal, such honeycomb cores (and corresponding composite sandwich assemblies) are not limited in geometry and other cell geometries are possible. Such other cell geometries include, but are not limited to, circles, rectangles, squares, triangles, etc. The material of the honeycomb core 140 can vary. In one embodiment, the honeycomb core is formed from fiberglass-reinforced phenolic resin. In other embodiments, the honeycomb core is formed from another fiber-reinforced resin. In further embodiments, the honeycomb core is formed from at least one of a plastic material, a metal, a coated paper material, or any other suitable material that enables the honeycomb core to function as disclosed herein.

The thermoset is applied to the honeycomb core (forming the referenced modified honeycomb core), e.g., in the form of a film material. The thermoset film can vary in thickness which may be selected, e.g., based on the parameters of the honeycomb core with which it is to be associated. For example, the thermoset film thickness can be in the range of from about 0.001 to about 0.035 inches, such as from about 0.001 to about 0.005 inches or from about 0.0015 to about 0.004 inches, or from about 0.01 to about 0.05 inches, from about 0.015 inches to about 0.035 inches, or from about 0.017 to about 0.03 inches. In one particular embodiments, the thermoset film material is about 0.017 inches thick. Advantageously, the film covers substantially all of the surface of the honeycomb core, such that substantially all cells within the honeycomb core are covered with the film.

Figure 4A:
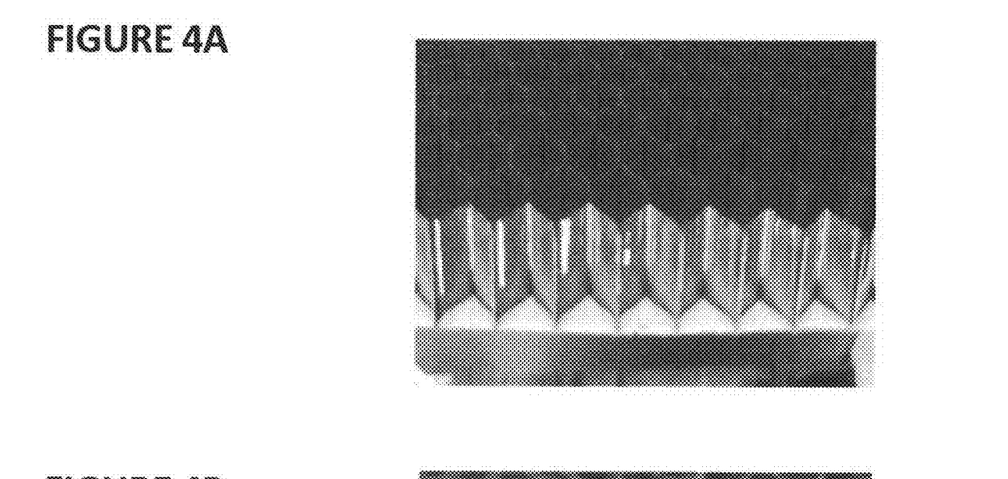
FIGS. 4A, 4B, and 4C are photographs of an exemplary modified honeycomb core comprising a thermoset film according to an embodiment of the present disclosure, shown in side view (A), top view (B), and bottom view (C)
Figure 4B:
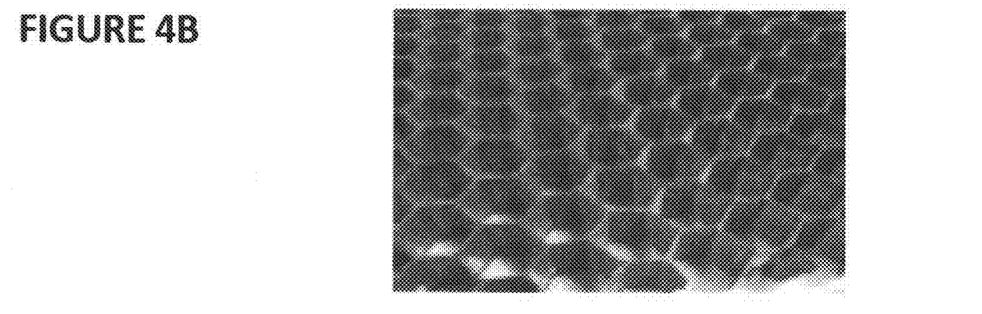
Figure 4C:
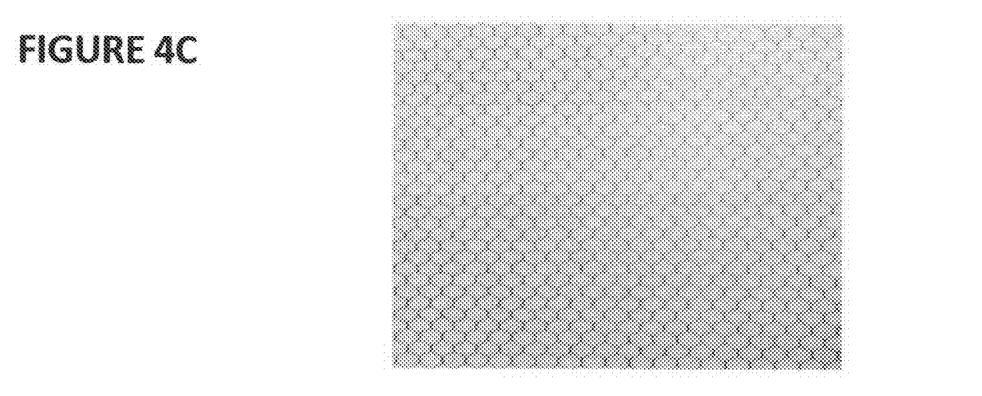

FIG. 3 provides a schematic side view of an exemplary modified honeycomb core, comprising a modified honeycomb core 150 comprising a thermoset film 160 as disclosed herein. FIGS. 4A, 4B, and 4C are photographs of an exemplary modified honeycomb core comprising a thermoset film, shown in side view (A), top view (B), and bottom view (C). Advantageously, the thermoset film 160 is bonded directly to the walls at the open face of the cells of the honeycomb core (e.g., on the bottom face of the honeycomb core). In various embodiments, no adhesive is required to co-bond these two materials. The film, in some embodiments, is applied to the bottom surface of the honeycomb core in uncured form, and is subsequently cured in place to afford the desired bond between these two components to give the modified honeycomb core described herein.

The thermoset film 160 is perforated, typically to generate a desired percentage open area (POA) value for acoustic performance. The number of perforations and diameter of such perforations can vary to achieve the desired POA. In some embodiments, the desired POA is from about 2 to about 15 or about 3 to about 5 or about 5 to about 10, such as, in certain particular embodiments, POA values of about 3, 4, 5, 6, 7, or 8. In some embodiments, the perforations are, on average, from about 0.0005 inches to about 0.015 inches, such as 0.001 inches to about 0.015 inches, from 0.001 inches to about 0.01 inches, or from about 0.005 to about 0.01 inches or 0.003 to about 0.008 inches in diameter.

Advantageously, this structure avoids the need for embedding septum material within individual honeycomb core cells (as shown in FIG. 2A). Rather, the septum material can be applied, e.g., in the form of a film, onto the top face of the honeycomb core, such that the septum material becomes positioned between the honeycomb layer and the facesheet layer of an acoustic sandwich assembly (as provided in further detail herein below). As such, the septum material can be described as not extending down into the individual cells of the honeycomb core to any significant extent. Such a configuration is distinguishable over, e.g., typical acoustic structures comprising a septum material embedded within individual honeycomb core cells (in which the septum is at some depth down within the core cells sufficient to provide desired noise dampening properties).

Figure 5:
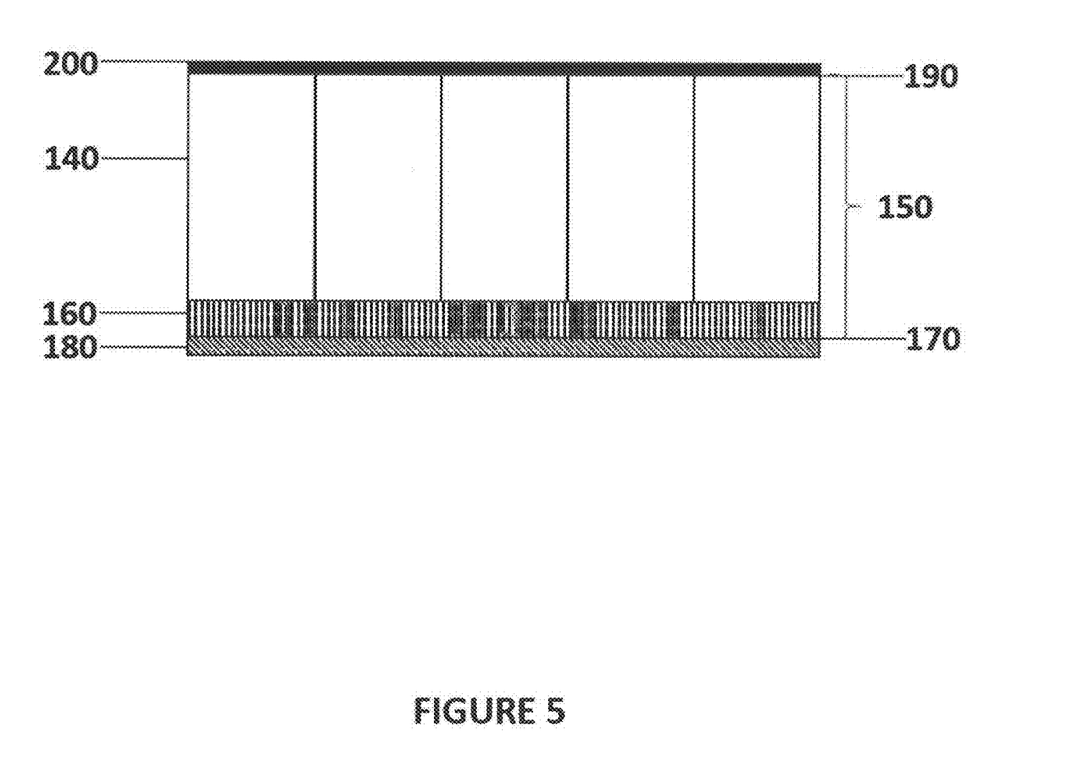
FIG. 5 is a perspective view of a portion of an embodiment of a composite sandwich configuration according to an embodiment of the present disclosure.
Figure 6A:
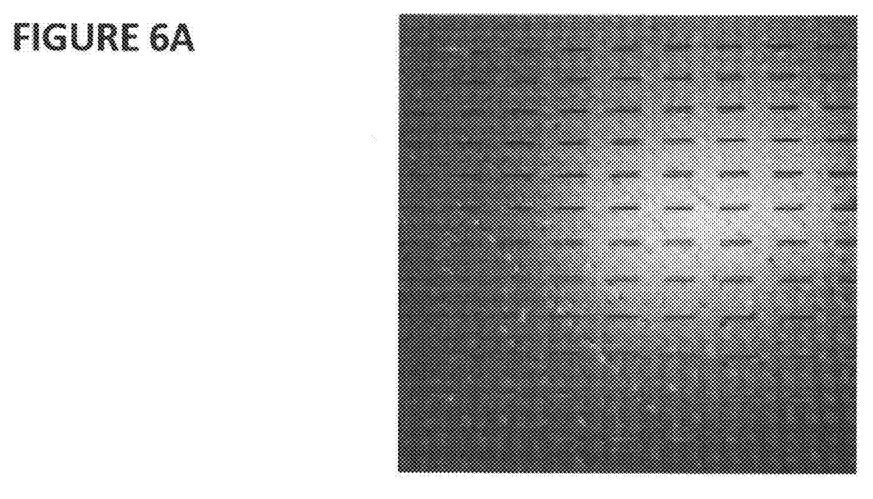
FIGS. 6A and 6B are photographs of facesheets that can be used within composite sandwich assemblies, according to an embodiment of the present disclosure.
Figure 6B:
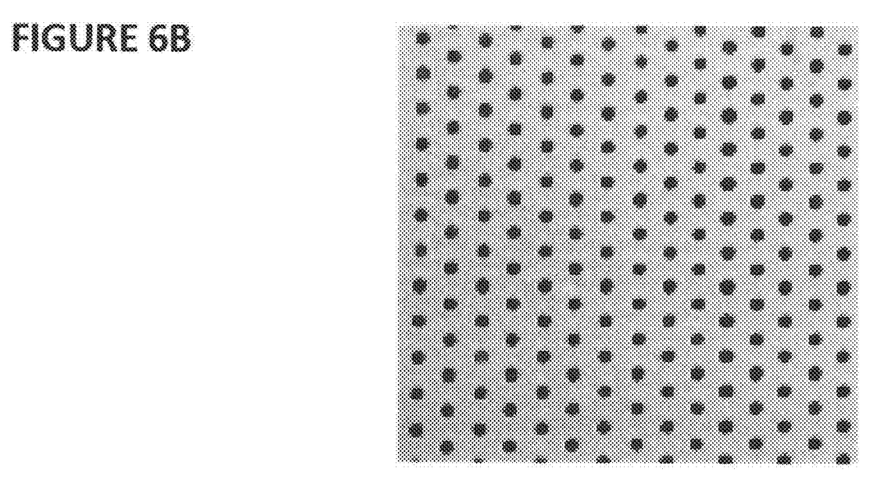

The modified honeycomb core is conveniently incorporated within a composite sandwich assembly for use, e.g., as an acoustic liner. FIG. 5 provides a schematic drawing of an exemplary composite sandwich assembly in accordance with the present disclosure, comprising the modified honeycomb core described above. Again, 140 is the honeycomb core, with 160 representing the thermoset film co-bonded thereto, giving modified honeycomb core 150. Adjacent to, and co-bonded to modified honeycomb core 150 (on the face of the thermoset film 160) is a facesheet 180, which is slotted/perforated. FIGS. 6A and 6B are photographs of typical acoustically treated facesheets (comprising orifices, e.g., slots and perforations, respectively) that are suitable for use as facesheet 180. This bonding generally results in the cells 142 of the honeycomb core (as illustrated in FIG. 2) being acoustically coupled to the orifices of facesheet 150.

Facesheet 180 can comprise various materials and, in some embodiments, is a carbon-reinforced thermoplastic fabric or another composite material such as a graphite/epoxy facesheet. Advantageously, in some embodiments, both thermoset film 160 and facesheet 180 comprise a thermoset material, simplifying bonding therebetween and, in some cases, providing a stronger bond than typically formed between facesheets and other honeycomb core structures. In other embodiments, facesheet 180 comprises a thermoplastic material, again with enhanced bonding as than that typically formed between facesheets and other honeycomb core structures. Advantageously, the bonding of a thermoset film 160 and the adjacent facesheet 180 can avoid resin wetting during cure. With conventional acoustic structure designs, the viscosity of resin system(s) associated with a facesheet (e.g., fiber-reinforced preimpregnated material system(s)) decreases as the temperature is increased (such as during the defined cure cycle in an autoclave, oven or other cure media). The reduced resin viscosity during the cure cycle increases the flow of the resin(s) prior to the onset of gelation during which time the resin(s) can saturate or wick into the imbedded acoustic treatment, effectively reducing or negating any benefit associated with the desired acoustically treated structure. Advantageously, the design provided herein reduces or eliminates such concerns.

Facesheet 180 may be bonded to modified honeycomb core 150 by an adhesive 170, as generally known in the art. In certain embodiments, adhesive 170 is a reticulated film adhesive to facilitate avoiding interference with the acoustic coupling the modified honeycomb core to facesheet 180.

The orifices can be disposed in any suitable pattern on facesheet 180 and can be of any suitable shape. For example, they can be perforations that are, e.g., substantially circular in shape or can be slots (substantially oblong or rectangular in shape). The diameter of such perforations within facesheet 180 can be, e.g., on the order of from about 0.02 inches to about 0.3 inches or from 0.02 inches to about 0.1 inches, from about 0.05 inches to about 0.3 inches or from about 0.05 inches to about 0.1 inches in diameter and can be modified to a desirable value to give a desired broadband acoustic response. Where facesheet 180 comprises slots, the length and width of such slots can vary and can again be designed for the desired broadband acoustic response. In some embodiments, such slots can have widths of, e.g., less than about 0.1 inch, such as about 0.005 inches to about 0.1 inches, about 0.01 to about 0.1 inches, about 0.02 to about 0.1 inches, or about 0.01 to about 0.05 inches. Corresponding lengths of such slots can be, e.g., from a value equivalent to the width of the slot to about 1 inch, e.g., about 0.01 inches to about 1 inch, about 0.05 inches to about 1 inch, about 0.1 inches to about 1 inch, about 0.05 to about 0.35 inches, about 0.1 to about 0.35 inches, or about 0.15 to about 0.35 inches.

It is noted that, typically, the diameters of the orifices (or lengths and/or widths of slots) of thermoset film 160 of the modified honeycomb core are significantly smaller than that of the perforations of facesheet 180, e.g., about an order of magnitude smaller. In some embodiments, the POA of facesheet 180 is within the range of from about 5 to about 30 (e.g., about 5 to about 20 or about 10 to about 30).

As shown in FIG. 5, bonded to the opposing face of the modified honeycomb core 150 is a backside skin (also referred to herein as a "backskin") 200, which is generally solid (i.e., comprising no perforations or orifices extending therethrough). This backskin 200 may be bonded to the modified honeycomb core, e.g., by an adhesive 190, as generally known in the art. In certain embodiments, adhesive 190 is a reticulated film adhesive to facilitate avoiding interference with the acoustic coupling the modified honeycomb core to backskin 200.

The composite sandwich assemblies provided herein can advantageously provide sufficient sound dampening, e.g., as a single degree of freedom (SDOF) acoustic structure. Advantageously, such assemblies can maintain net non-linear factor (NLF) acoustic values and/or Rayl flow resistance numbers for superior acoustic properties.

The composite sandwich assemblies provided herein further can advantageously exhibit sufficient mechanical strength to render them useful for a range of applications. In some embodiments, bonding at the interfaces of the layers of the composite sandwich assemblies provided herein demonstrate sufficient strength, including, in some embodiments, enhanced bonding between layers as compared with composites comprising thermoplastic septa materials embedded within the cells of the honeycomb core.

Figure 7:
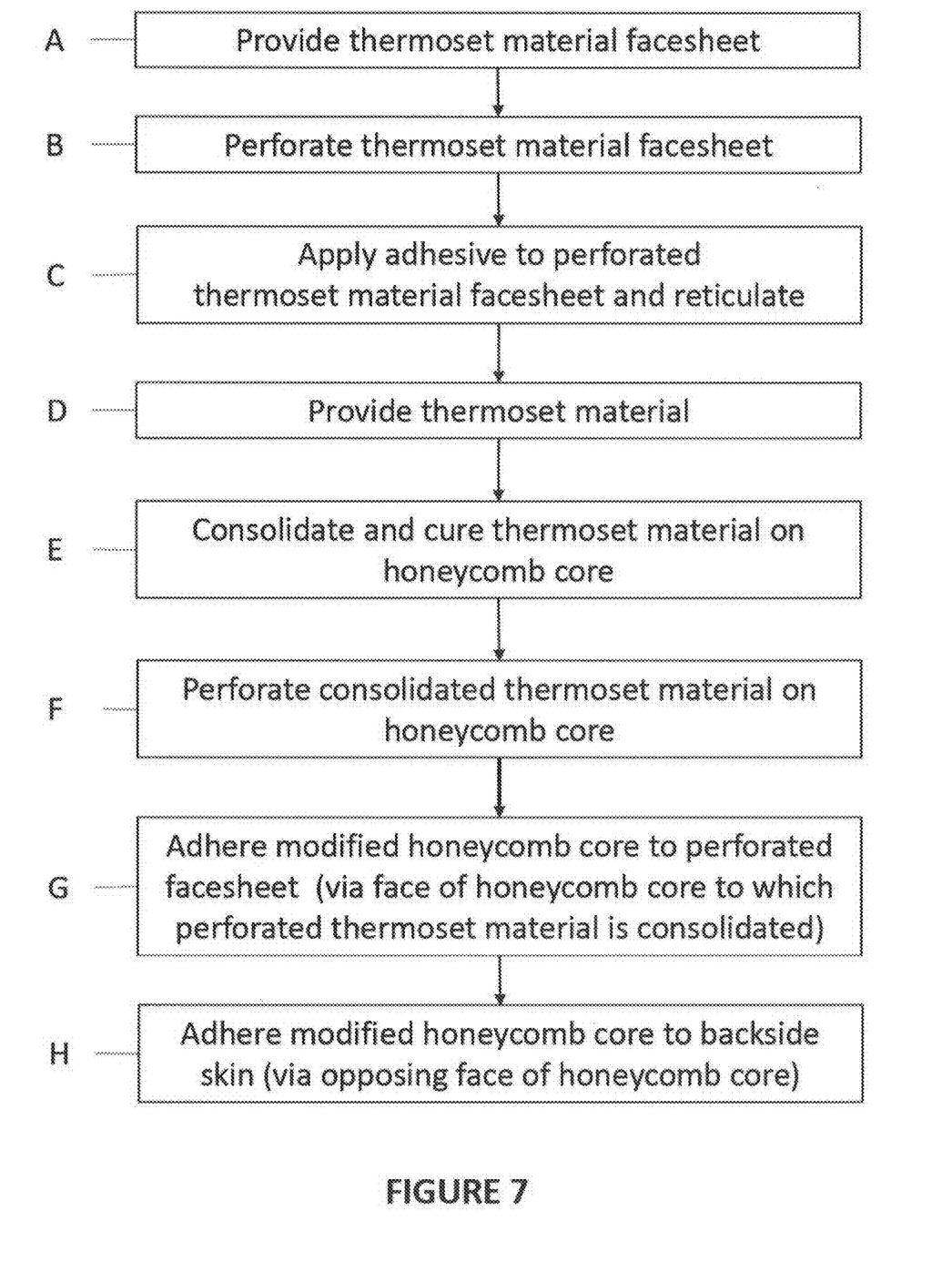
FIG. 7 is a flowchart illustrating the steps of a representative process for the production of a composite sandwich configuration, according to an embodiment of the present disclosure.

FIG. 7 provides a flow chart of a process for the production of a composite sandwich assembly according to the present disclosure. Step A is providing a facesheet material, and Step B is processing that facesheet material to introduce orifices therethrough (e.g., slots or perforations). This processing can be done, e.g., by a drill of the appropriate size and shape. In Step C, an adhesive 170 is applied to a surface of the perforated/slotted facesheet 180. The adhesive, as noted above, can be any adhesive generally known in the art for the construction of composite structures. Subsequently, this construction is generally reticulated to remove excess adhesive 170 from the perforations within the perforated/slotted facesheet 180.

Step D is providing a thermoset material 160 (e.g., film). The thermoset film 160 is then, in Step E, consolidated to a honeycomb core 140 and cured thereon. At step F, this consolidated core/thermoset film is processed to provide orifices (e.g., perforations or slots) therethrough to give "modified honeycomb core" 150. This processing is advantageously done by laser treatment to obtain the desired amount, patterning, and size of orifices through the thermoset film. At Step G, the modified honeycomb core is assembled with the perforated/slotted facesheet material such that the adhesive 170 is present between the perforated/slotted facesheet material and the perforated/slotted thermoset film, and the adhesive material is cured, providing a bond between these adjacent layers. Step H is applying an adhesive 190 (again, any adhesive known for the construction of composite structures) and backside skin 200 to the modified honeycomb core 150. It is to be understood that the order of operations provided in FIG. 7 and referenced herein above is not intended to be limiting, but, rather, provides one embodiment of a method that can be employed for the production of the composite structures described herein.

In certain embodiments, the disclosed process and corresponding composite sandwich assemblies produced thereby provide cost savings as compared with conventional processes and corresponding composite sandwich assemblies. In certain embodiments, the disclosed process and corresponding composite sandwich assemblies provide improvements over at least some known noise attenuation systems, e.g., for engine nacelles, such as airplane nacelles. As compared to at least some known noise attenuation systems, the embodiments disclosed herein facilitate an ease of manufacture of the nacelle by avoiding a time- and cost-intensive cell-by-cell septumization process (by providing a thermoset septum material generally applied to a surface of the honeycomb core, as outlined in detail above).

EXPERIMENTAL

Composite structures were prepared in accordance with the foregoing and tested in a noise engineering laboratory to characterize non-linear factor (NLF) acoustic values and Rayl flow resistance values for each. The composite structures tested comprised a roughly 1 foot by 1 foot piece of fiberglass honeycomb core (about 1" thick) with an epoxy-based thermoset material (from Dexter Hysol) cured thereon with an average thickness of about 0.017 inches. No facesheet was employed in the tested composite structures and the backsides of the honeycomb cores were blocked for testing to restrict airflow, per conventional processes. As such, the tested composites were comparable in structure to one another, except that the thermoset materials had different POA values (and one sample had a different average pore diameter), as shown in the Table below.

| Structure of Thermoset | Rayl 105 (average) | NLF (average) |
|---|---|---|
| 12 POA, 0.002 inch diameter | 11.1204 | 2.2163 |
| 8 P OA, 0.0015 inch diameter | 16.8108 | 2.5887 |
| 8 POA, 0.002 inch diameter | 9.3165 | 2.1017 |
| 12 POA, 0.002 inch diameter, 30,200 holes/in$^2$ | 10.2553 | 2.178 |
| 4 POA, 0.002 inch diameter | 1354.86 | 4.45 |

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

That which is claimed:

1. A co-bonded acoustic liner, comprising:
   a honeycomb core comprising a honeycomb structured pattern forming cells with cell walls, a top face perpendicular to the cell walls and on a top, open surface of the cells, and a bottom face perpendicular to the cell walls and on a bottom, open surface of the cells;
   a thermoset-based plastic septa material co-bonded to the top face of the honeycomb core without adhesive, wherein the thermoset-based plastic septa material remains on the top face at an outside edge of the honeycomb core such that the thermoset-based plastic septa material does not extend any significant extent into the cell walls toward the bottom face of the honeycomb core;
   a facesheet comprising perforations to enable airflow, co-bonded to the thermoset-based plastic septa material; and
   an optional backside skin positioned under the honeycomb core, co-bonded to the bottom face of the honeycomb core,
   wherein the co-bonded acoustic liner supports a single degree of freedom acoustic structure.

2. The co-bonded acoustic liner of claim 1, wherein the thermoset-based plastic septa material is formed of a film at the outside edge of the honeycomb core.

3. The co-bonded acoustic liner of claim 2, wherein the film is from about 0.015 inches to about 0.035 inches in thickness.

4. The co-bonded acoustic liner of claim 1, wherein the thermoset-based plastic septa material comprises an epoxy.

5. The co-bonded acoustic liner of claim 1, wherein the thermoset-based plastic septa material comprises perforations.

6. The co-bonded acoustic liner of claim 5, wherein the thermoset-based plastic septa material has a percentage open area of from about 2 to about 15.

7. The co-bonded acoustic liner of claim 5, wherein the thermoset-based plastic septa material comprises the perforations having a size of from about 0.001 inches to about 0.01 inches in diameter.

8. The co-bonded acoustic liner of claim 5, wherein perforations within the thermoset-based plastic septa material are smaller in diameter than the perforations of the facesheet.

9. The co-bonded acoustic liner of claim 1, wherein the facesheet has a percentage open area of from about 10 to about 30.

10. The co-bonded acoustic liner of claim 1, wherein the facesheet comprises the perforations having a size of from about 0.02 inches to about 0.3 inches in diameter.

11. The co-bonded acoustic liner of claim 1, wherein the facesheet comprises a thermoplastic material or a thermoset material.

12. The co-bonded acoustic liner of claim 1, further comprising an adhesive layer between the facesheet and the thermoset-based plastic septa material.

13. The co-bonded acoustic liner of claim 12, wherein the adhesive layer comprises a reticulated film adhesive.

14. The co-bonded acoustic liner of claim 1, further comprising an adhesive layer between the optional backside skin and the bottom face of the honeycomb core.

15. The co-bonded acoustic liner of claim 14, wherein the adhesive layer comprises a reticulated film adhesive.

16. A nacelle for an airplane engine comprising the co-bonded acoustic liner of claim 1.

17. A method of producing of co-bonded acoustic liner, comprising:
providing a honeycomb core comprising a honeycomb structured pattern forming cells with cell walls, a top face perpendicular to the cell walls and on a top, open surface of the cells, and a bottom face perpendicular to the cell walls and on a bottom, open surface of the cells;
applying and curing a thermoset-based plastic septa material directly onto the top face of the honeycomb core, wherein the thermoset-based plastic septa material remains on the top face at an outside edge of the honeycomb core such that the thermoset-based plastic septa material does not extend substantially into the cell walls toward the bottom face of the honeycomb core; and
adhering a facesheet comprising perforations to the thermoset-based plastic septa material to provide the co-bonded acoustic liner, wherein the co-bonded acoustic liner supports a single degree of freedom acoustic structure.

18. The method of claim 17, wherein the thermoset-based plastic septa material is applied as a film.

19. The method of claim 17, wherein the thermoset-based plastic septa material comprises an epoxy.

20. The method of claim 17, further comprising perforating the thermoset-based plastic septa material after applying and curing the thermoset-based plastic septa material onto the top face of the honeycomb core.

21. The method of claim 20, wherein perforating the thermoset-based plastic septa material comprises laser perforating.

22. The method of claim 21, wherein laser perforating the thermoset-based plastic septa material comprises making perforations to give a percentage open area of from about 2 to about 15.

23. The method of claim 21, wherein laser perforating the thermoset-based plastic septa material comprises making perforations of from about 0.0005 inches to about 0.01 inches in diameter.

24. The method of claim 17, further comprising applying a backside skin to the bottom face of the honeycomb core.

25. The method of claim 24, further comprising applying an adhesive between the backside skin and the bottom face of the honeycomb core.

26. The method of claim 17, further comprising perforating the facesheet before applying and curing the thermoset-based plastic septa material onto the top face of the honeycomb core.

* * * * *